UNITED STATES PATENT OFFICE 1,996,797

PRODUCTION OF CELLULOSIC PRODUCTS

Henry Dreyfus, London, England

No Drawing. Application September 25, 1931, Serial No. 565,203. In Great Britain November 26, 1930

6 Claims. (Cl. 92—1)

This invention relates to the treatment of cellulose or cellulosic materials, whether in the form containing incrusting substances, as in wood, straw, grass or the like or in the form initially free or wholly or partly freed from such incrusting substances, for the purpose of increasing their active surface to facilitate uniform and rapid attack of reagents upon the materials.

The invention is especially suitable for use in the production of cellulose or cellulosic materials from wood, straw, grasses or the like. It may likewise be advantageously applied to the treatment of cellulose or cellulosic materials free or substantially free or wholly or partly freed from incrusting substances, and particularly to sulphite, sulphate or other wood pulps for the purpose of increasing their active surface and thereby facilitating uniform and rapid attack of solvents or chemical reagents upon the materials.

According to the invention cellulose or cellulosic materials, whether or not containing incrusting substances, are subjected to treatment comprising the development and release of gaseous or vaporous pressure within the materials.

By these means the active surface of the materials can readily be increased to a very large extent, thereby ensuring a very uniform and rapid attack of the reagents, as the action of the treatment is to open up or expand in a very large measure, or even to disintegrate, the materials.

In performing the invention I may for instance develop the necessary pressure by the vapourization of liquids within the materials. Thus, for instance, the materials may be impregnated with water or aqueous solutions and subjected to heat in closed vessels to generate the vapourous pressure within the materials, whereafter the vessel or a release upon the same may be opened to release the pressure. Preferably the release of pressure is effected as rapidly as possible as the more rapid the release the greater is the opening up or disintegrating effect upon the materials. In such a form of execution the temperature to which the impregnated materials are to be heated will of course depend upon the pressure it is desired to develop and as to whether water or any particular aqueous solution is to be employed. In general, however, especially when the materials are impregnated with water or dilute alkalis, temperatures of from about 120–150° C., and particularly from 130–140° C., are very suitable. In cases where solutions such as dilute alkalis are employed it is preferable that the alkalis or the like should, besides being present in dilute form (e. g. in the form of a solution of about 1–10% strength), be present in amount relatively small with regard to the cellulose content of the materials, e. g. in an amount between about $\frac{1}{10}$ to $\frac{1}{2}$% of the cellulose present. Preferably the materials are heated for only such time as is necessary to attain the maximum pressure.

In cases where the treatment comprises the development and release of gaseous pressure with the materials, the materials may be impregnated with substances such for instance as a solution of carbonic acid or a bicarbonate (e. g. sodium bicarbonate), adapted to liberate a gas on heating. In such a form of execution the impregnated materials may be heated, preferably in closed vessels, to a convenient temperature to liberate the gases under the desired pressure within the materials, for instance especially when the materials are impregnated with a solution of a bicarbonate or the like they may be heated to a temperature of about 120–150° C. and especially 130–140°C.

When the materials contain resins and the like they may, prior to impregnation with the water, aqueous solutions of bicarbonates or other substances adapted to develop the pressure within the materials, advantageously be subjected to treatment to extract the resins and the like in order to ensure thorough and homogeneous impregnation of the materials. For instance the resins and the like may be extracted by means of caustic soda.

In order to ensure thorough impregnation and uniform action the impregnation of the materials with the water, solutions of bicarbonates or other substances adapted to develop the pressure within the materials, may be effected under pressure.

The materials are preferably subjected to the process of the invention in a fine form. Thus, for instance, wood or wood pulps are preferably employed in the form of chips or sawdust whilst straw, grasses or the like may conveniently be torn or shredded to fine dimensions. It should, however, be noted that the initial reduction of the materials to such a fine state of division as obtains in mechanical wood pulp serves no useful purpose. In fact in the production of mechanical wood pulp the excessive mechanical action has a detrimental action on the cellulose molecule. By means of the invention a very fine state of division can readily be obtained without recourse to drastic mechanical treatment of the wood, straw or the like.

When the invention is to be applied to the pulping of wood, straw, grasses or the like, the materials, after subjection to the treatment comprising the development and release of pressure within them, may, according to the invention, be subjected to any pulping process, e. g. to the sulphite, sulphide or soda pulping processes, the substances (or residues thereof) employed in the treatment for developing and releasing the pressure being removed, if desired or required, by any convenient means prior to subjecting the materials to the pulping process. The pulps so produced are on account, inter alia, of their state of division or disintegration highly useful for the production of cellulose derivatives or for the production of cellulosic solutions. If desired they may be subjected to any treatment to remove residual impurities prior to applying them to such uses, and in cases where they are employed for the production of cellulose acetate or other cellulose esters they may also, if desired, be subjected to treatment, e. g. with acetic acid or the like, to render them more reactive for the esterification.

In the case where wood pulps or other cellulose or cellulosic materials initially free or initially partly freed from incrusting substances have been subjected to the treatment comprising the development and release of pressure within them, they may, in accordance with the invention, be subjected to any treatment with solvents or chemical reagents for the purpose of producing any useful products. Thus for instance they may be xanthogenated to produce solutions highly useful for spinning into threads or films by the viscose process. Further, for instance, they may be subjected to esterification or etherification to produce cellulose acetate, cellulose nitrate or other esters of cellulose, or ethyl cellulose, or other ethers of cellulose, and such esters or ethers may be employed for the preparations, solutions, dopes, varnishes, artificial filaments, threads, films, plastic masses. In the case where wood pulps so treated are employed for the production of cellulose acetate and other cellulose esters the same are preferably employed in the form substantially free from impurities, or treated to remove the impurities prior to the esterification; further, they may advantageously be pretreated, e. g. with acetic acid, prior to the esterification.

The following examples serve to illustrate convenient forms of execution of the invention, it being understood that they are given solely by way of illustration and are in no way limitative.

*Example 1*

Wood in the form of chips is first extracted with cold caustic soda of about 5% strength to remove matters soluble in the caustic soda. The extracted wood is then washed with water to remove the caustic soda as far as possible and dried in any convenient way. The extracted and dried wood is impregnated with a saturated solution of sodium bicarbonate preferably in a closed vessel under pressure and preferably employing greater quantities of the solution than can be absorbed by the wood. The wood, after impregnation, is heated in a closed vessel to a temperature between 130 and 140° C. and upon the attainment of such temperature, the developed pressure is released as suddenly and rapidly as possible. The resulting materials have their active surface increased in a very large measure. They are washed to remove the sodium carbonate as far as possible and subjected to pulping by the sulphite, soda, or sulphate process.

*Example 2*

Sulphite wood pulp in the form of chips is impregnated with a saturated solution of sodium bicarbonate, preferably in a closed vessel and under pressure, a quantity of sodium bicarbonate solution in excess of that capable of being absorbed by the pulp being preferably employed. The impregnated pulp is heated in a closed vessel to a temperature between 130 and 140° C. and upon attainment of such temperature, the developed pressure is released as suddenly and rapidly as possible. The resulting pulp has its active surface increased to a very large degree and is highly suitable for use in the production of cellulosic solutions or cellulose derivatives. Prior to applying the treated pulp to such uses it is preferably washed to remove the sodium carbonate, and in the case where it is to be used for making cellulose acetate or other organic esters of cellulose, it may with advantage be pretreated with acetic acid in the known manner prior to subjecting the pulp to the esterification.

What I claim and desire to secure by Letters Patent is:—

1. Process for the production of cellulose or cellulosic products from wood, straw, grass and like materials, which comprises extracting resins and the like therefrom, developing gaseous or vaporous pressure within the materials and suddenly releasing the same, and thereafter subjecting the materials to a chemical pulping process.

2. Process according to claim 1, and wherein pressure is developed within the materials by impregnating the materials with at least one liquid and vaporizing the liquid by heating the impregnated materials in a closed vessel.

3. Process according to claim 1, and wherein pressure is developed within the materials by impregnating the materials with at least one substance adapted to liberate a gas on heating and heating the impregnated materials in a closed vessel.

4. Process for the production of cellulose or cellulosic products from wood, straw, grasses and like material, which comprises extracting resins and the like therefrom, subsequently developing gaseous or vaporous pressure within the materials and suddenly releasing the same.

5. Process comprising impregnating wood, straw, grass and like materials with at least one substance adapted to liberate a gas on heating, heating the impregnated materials to a temperature between 120 and 150° C. in a closed vessel, suddenly releasing the pressure developed within the materials, and thereafter subjecting the materials to a chemical pulping process.

6. Process comprising extracting resins, lignins and other non-cellulosic constituents from cellulose containing materials, developing gaseous or vaporous pressure within the cellulose itself and suddenly releasing the same, and thereafter subjecting the cellulose to conversion treatments.

HENRY DREYFUS.